United States Patent
Herden et al.

(10) Patent No.: US 7,810,462 B2
(45) Date of Patent: Oct. 12, 2010

(54) METHOD FOR OPERATING AN IGNITION DEVICE FOR AN INTERNAL COMBUSTION ENGINE

(75) Inventors: Werner Herden, Gerlingen (DE); Manfred Vogel, Ditzingen (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/227,754

(22) PCT Filed: May 22, 2007

(86) PCT No.: PCT/EP2007/054922

§ 371 (c)(1),
(2), (4) Date: Feb. 26, 2009

(87) PCT Pub. No.: WO2008/006638

PCT Pub. Date: Jan. 17, 2008

(65) Prior Publication Data

US 2010/0018487 A1  Jan. 28, 2010

(30) Foreign Application Priority Data

Jul. 10, 2006 (DE) ..................... 10 2006 031 768

(51) Int. Cl.
*F02P 23/04* (2006.01)
*H01S 3/131* (2006.01)
(52) U.S. Cl. .................. 123/143 B; 372/10; 372/12; 372/25; 372/69; 372/108
(58) Field of Classification Search ............. 123/143 B; 372/10, 12, 25, 69, 108, 109; 385/16, 31, 385/32, 50, 147
See application file for complete search history.

(56) References Cited

U.S. PATENT DOCUMENTS

| | | | |
|---|---|---|---|
| 4,416,226 A * | 11/1983 | Nishida et al. | 123/143 B |
| 5,608,742 A * | 3/1997 | Petersen | 372/6 |
| 5,756,924 A | 5/1998 | Early | |
| 6,382,957 B1 | 5/2002 | Early et al. | |
| 6,842,466 B1 | 1/2005 | Tam et al. | |
| 7,036,476 B2 * | 5/2006 | Wintner et al. | 123/143 B |
| 7,114,858 B2 * | 10/2006 | Gupta et al. | 385/88 |
| 7,421,166 B1 * | 9/2008 | Woodruff et al. | 385/39 |
| 2006/0037572 A1 | 2/2006 | Yalin et al. | |
| 2009/0133654 A1 * | 5/2009 | Bihari et al. | 123/143 B |
| 2009/0159033 A1 * | 6/2009 | Steigleman et al. | 123/143 B |

FOREIGN PATENT DOCUMENTS

DE  3400034  7/1985

(Continued)

OTHER PUBLICATIONS

International Search Report, PCT International Patent Application No. PCT/EP2007/054922, dated Aug. 17, 2007.

*Primary Examiner*—Erick Solis
(74) *Attorney, Agent, or Firm*—Kenyon & Kenyon LLP

(57) ABSTRACT

A method for operating an ignition device for an internal combustion engine, particularly of a motor vehicle, having a laser device which has a laser-active solid that has a passive Q-switch. The duration of a pumping light pulse that is applied to the laser device is selected as a function of a specifiable number of laser pulses that is to be generated using the laser device.

9 Claims, 3 Drawing Sheets

| | FOREIGN PATENT DOCUMENTS | |
|---|---|---|
| DE | 102006000205 | 11/2006 |
| EP | 1253316 | 10/2002 |
| JP | 2006242036 | 9/2006 |
| KR | 20040049078 | 6/2004 |
| WO | WO 2005066488 | 7/2005 |

* cited by examiner

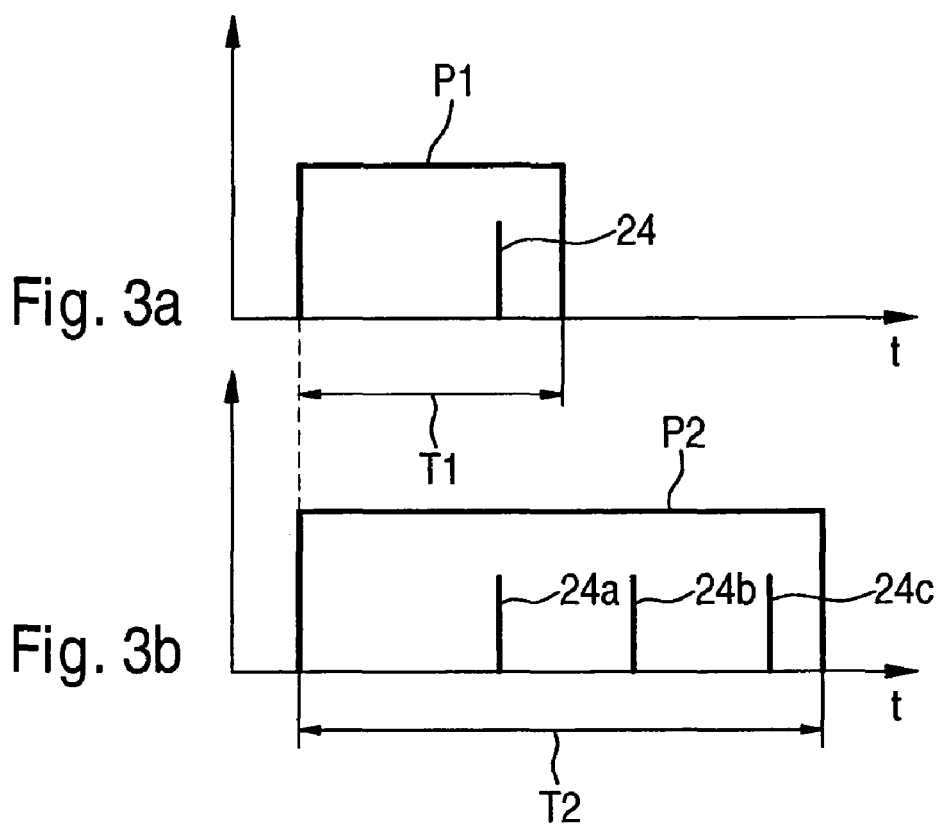
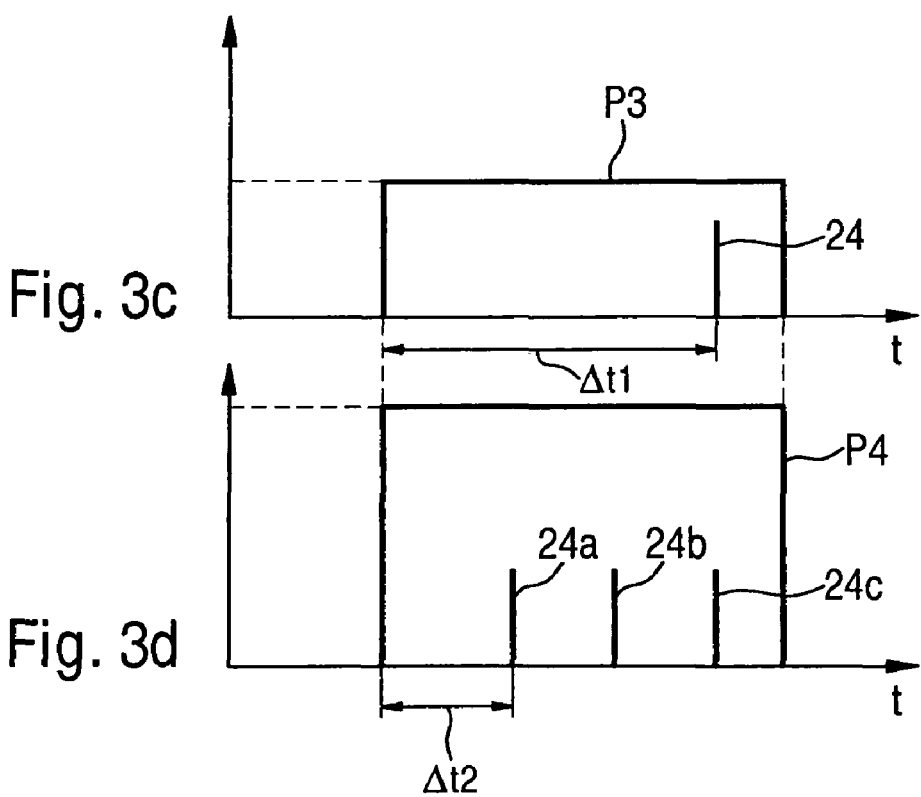

METHOD FOR OPERATING AN IGNITION DEVICE FOR AN INTERNAL COMBUSTION ENGINE

FIELD OF THE INVENTION

The present invention relates to a method for operating an ignition device for an internal combustion engine, particularly of a motor vehicle, having a laser device which has a laser-active solid that has passive Q-switching. The present invention also relates to such an ignition device.

SUMMARY

It is an object of the present invention to improve an operating method and an ignition device, of the type mentioned at the outset, to the extent that their flexibility and reliability are increased.

This object may be attained by the present invention in the case of an operating method, of the type mentioned at the outset, in that the duration of a pumping light pulse that is applied to the laser device is selected as a function of a specified number of laser pulses that are to be generated using the laser device.

Because of the selection or specification, according to an example embodiment of the present invention, of the duration of the pumping light pulses it is advantageously possible, during a single pumping light pulse, immediately to generate a plurality of laser pulses, successive in time, using the laser device. The plurality of laser pulses generated in a comparatively brief time sequence may be advantageously used, for example, for cleaning a combustion chamber window of the laser device, through which the laser pulses generated by the laser device are usually irradiated into a combustion chamber of the internal combustion engine.

Moreover, the plurality of laser pulses generated according to the present invention is advantageously usable for implementing a so-called multiple-spark ignition, that is, because of the immediate eradiation of a plurality of laser pulses into the combustion chamber, during a single power cycle of the respective cylinder, it is possible to increase the probability of striking a flammable part of the air/fuel mixture located in the combustion chamber, using the laser pulses, so that the reliability of the ignition device according to the present invention is increased thereby.

Additional features, possible uses and advantages of the present invention are derived from the description below of exemplary embodiments of the present invention, which are illustrated in the figures. All of the features described or illustrated constitute the subject matter of the present invention either alone or in any combination, regardless of the way they are combined, and regardless of their representation in the description or their illustration in the figures.

BRIEF DESCRIPTION OF THE DRAWINGS

FIGS. 3a-3d show various sequences in time of pumping light pulses and the laser pulses generated thereby, corresponding to the example method according to the present invention.

DETAILED DESCRIPTION OF EXAMPLE EMBODIMENTS

Figure 1:
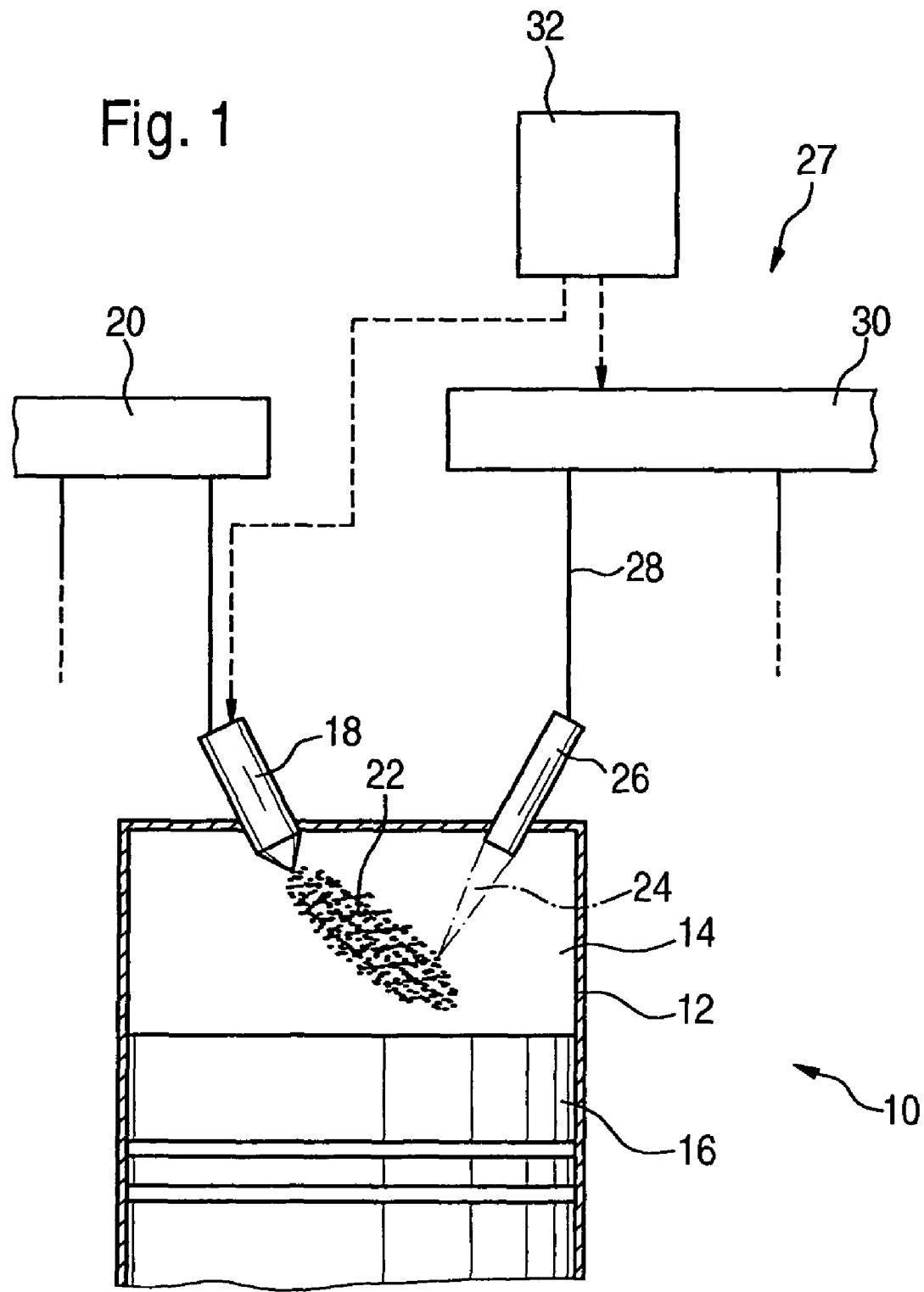
FIG. 1 shows a schematic illustration of an internal combustion engine having an example ignition device according to the present invention.

In FIG. 1, an internal combustion engine in its entirety bears reference numeral 10. It is used for driving a motor vehicle. Internal combustion engine 10 includes a plurality of cylinders, of which only one, having a combustion chamber 12, is shown in FIG. 1. A combustion chamber 14 of cylinder 12 is bordered by a piston 16. Fuel reaches combustion chamber 14 directly through an injector 18, which is connected to a fuel pressure reservoir 20 that is also designated as a rail, or rather, common rail.

Fuel 22 injected into combustion chamber 14 is ignited using a laser pulse 24, which is eradiated into combustion chamber 14 by an ignition device 27 that includes a laser device 26. For this purpose, laser device 26 is fed, via a light guide device 28, with a pumping light that is provided by a pumping light source 30. Pumping light source 30 is controlled by a control and regulating device 32, which also activates injector 18.

Pumping light source 30 may be a semiconductor laser diode, for instance, which, as a function of a control current, emits an appropriate pumping light via light guide device 28 to laser device 26. Although semiconductor laser diodes, and other pumping light sources that take up little space, are preferred for use in the motor vehicle field, for the purpose of operating ignition device 27 according to the present invention, every type of pumping light source is usable, in principle, in which the duration of the emitted pumping light pulse is able to be specified and set. In the case of a semiconductor laser diode as a pumping light source, the specification of the duration of the pumping light pulse may be set particularly simply by an appropriate length of the control current pulse.

Figure 2:
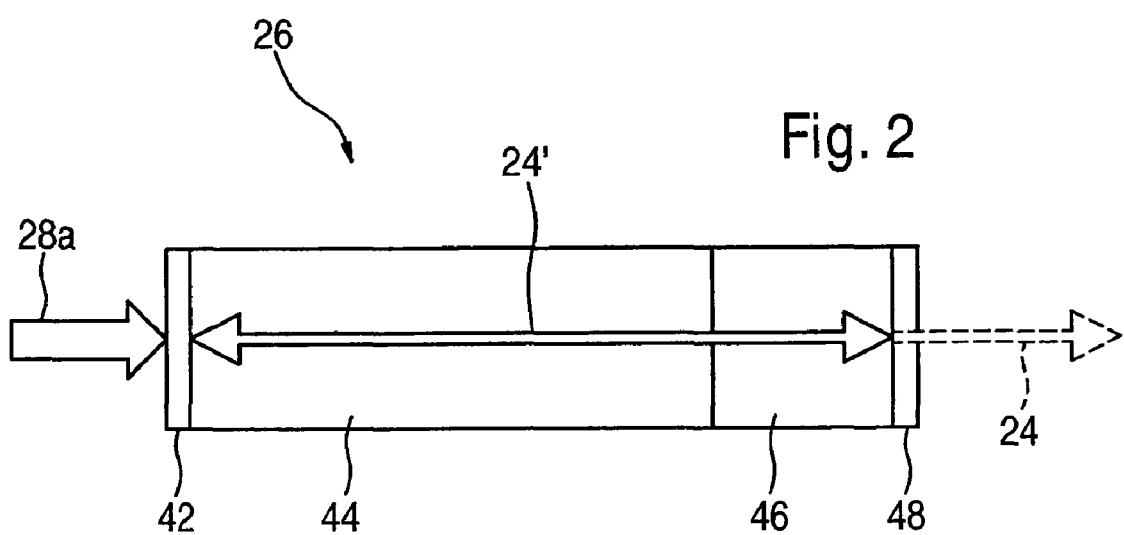
FIG. 2 shows a specific example embodiment of the ignition device in detail.

FIG. 2 shows schematically a detailed view of laser device 26 from FIG. 1.

As may be seen in FIG. 2, laser device 26 has a laser-active solid 44 which has optically postconnected to it passive Q-switching 46 also designated as a Q-switch. Laser-active solid 44, together with passive Q-switch 46, as well as coupling mirror 42 situated to the left of laser-active solid 44 in FIG. 2, and output mirror 48 form a laser oscillator, whose oscillating behavior depends on passive Q-switch 46, and that being the case, is at least indirectly controllable in a manner known per se.

In the configuration illustrated in FIG. 2, laser device 26, or rather, laser-active solid 44 has applied to it pumping light 28a through coupling mirror 42, which excites electrons in laser-active solid 44 and thereby leads to an inversion of distribution.

While passive Q-switch 46 is in its idle state, in that it manifests a comparatively low transmission coefficient, laser operation is avoided in laser-active solid 44, or rather, in solid 44, 46 that is bordered by coupling mirror 42 and output mirror 48. However, with increasing pumping duration, that is, during the application of pumping light 28a, the radiation intensity in laser-oscillator 42, 44, 46, 48 also increases, so that passive Q-switch 46 finally fades. This means that its transmission coefficient increases, and laser operation in laser-oscillator 42, 44, 46, 48 begins. This condition is symbolized by double arrow 24'.

In the manner described above, a laser pulse 24 is created that is also designated as a giant pulse, which has a relatively high peak power, Laser pulse 24 is coupled into combustion chamber 14 (FIG. 1) of internal combustion engine 10, if necessary, using an additional light guide device (not shown), or directly through a combustion chamber window of laser device 26 that is also not shown, so that fuel 22, or rather, an air fuel mixture is ignited.

According to an example embodiment of the present invention, laser device 26, illustrated in FIG. 2, has pumping light pulses P1, P2, P3, P4, that are not shown in greater detail in FIGS. 3a to 3d, whose duration T1, T2, is advantageously selected as a function of a specifiable number of laser pulses 24, 24a, 24b, 24c that are to be generated using laser device 26.

For instance, when a first, relatively short pumping light pulse P1 of a duration T1, that is illustrated in FIG. 3a, is applied to laser device 26, the generation of exactly one laser pulse 24 in laser device 26 may be implemented.

If a plurality of successive laser pulses is to be generated, then, according to FIG. 3b, a pumping light pulse P2 having a greater duration T2>T1 is generated, which pumps laser-active solid 44 (FIG. 2) for a correspondingly longer time, and accordingly makes possible the generation of a plurality of laser pulses 24a, 24b, 24c that are successive in time.

Laser device 26 may advantageously be developed in such a way, for instance, that upon continuous application of a pumping light pulse P2, the separation in time of the successive laser pulses 24a, 24b, 24c amounts to about 20 µs to about 200 µs. The duration of pumping light pulses P1, P2 itself may amount, for instance, up to a few milliseconds or even more.

In one additional advantageous specific embodiment of the present invention, it is provided that the power of pumping light 28a be modified.

As may be seen in FIGS. 3c, 3d, because of such a modification of the power of pumping light 28a, the response in time in the generation of laser pulses 24, 24a, 24b, 24c by laser device 26 is also controllable.

According to FIG. 3c, in which a relatively low power is selected for pumping light 28a, the generation of a first laser pulse 24 takes place after a relatively long waiting time Δt1 with reference to the beginning of the pumping process using pumping light pulse P3.

By contrast to this, when pumping light pulse P4 of greater power is applied to laser device 26, cf. FIG. 3d, even after a shorter waiting time Δt2<Δt1, first laser pulse 24a occurs. According to FIG. 3d, during the duration of pumping light pulse P4, additional laser pulses 24b, 24c follow at an approximately constant time period after laser pulse 24a.

A combination of the variation in duration T1, T2 of a pumping light pulse P1, P2 with the variation in the power of a pumping light pulse is also conceivable.

In one further, very advantageous specific embodiment of the method according to the present invention, it is provided that, on account of an appropriate specification of the pumping light pulse, specifically a plurality of laser pulses 24b, 24c be generated, whereby a combustion chamber window, that is not shown, may be cleaned, which is situated at the output end of laser device 26, and through which laser pulses 24 pass into combustion chamber 14 of internal combustion engine 10 (FIG. 1).

Since a single laser pulse 24, which has the required energy for cleaning the combustion chamber window, is able to destroy the combustion chamber window under certain circumstances, based on the correspondingly high radiation density, the cleaning of the combustion chamber windows, according to an example embodiment of the present invention, by the application of a plurality of successive weaker laser pulses 24a, 24b, 24c is favorable for increasing the service life of the combustion chamber window.

The plurality of laser pulses 24, 24a, 24b, 24c generated according to an example embodiment of the present invention may also be used especially favorably for the reliable ignition of fuel 22 located in combustion chamber 14. Since there is the danger, especially in the case of greatly inhomogeneous air/fuel mixtures, that relatively short laser pulse 24, by chance, hits a region that is not, or is at least poorly flammable, because of the utilization, according to the present invention, of a plurality of laser pulses 24a, 24b, 24c for the ignition, the probability of hitting a flammable region in the air/fuel mixture, using at least one of the laser pulses, is increased.

In an additional very advantageous specific embodiment of the method according to the present invention, it is provided that the power of pumping light 28a is modified during a pumping light pulse P1, P2.

Because of such a modification of the power of pumping light 28a, during the duration of the respective pumping light pulse, the possibility advantageously exists to influence the behavior in time, especially the time period between two successive laser pulses 24a, 24b, even during the generation of laser pulses by the application of pumping light. In this manner, for example, a first number of laser pulses having a relatively short recurrence period may be generated, and after a corresponding reduction in the power of the pumping light, additional laser pulses may be generated, having a correspondingly longer trailing time.

The adjustment of the power of the pumping light may further be used to increase the operating safety of pumping light source 30, or to protect it from a thermal overload or the like.

Especially if a semiconductor laser diode is used as pumping light source 30, a very simple adjustment is achievable of the power of pumping light 28a, by the appropriate specification of the control current for the laser diode.

The principle according to the present invention is not limited to the use for internal combustion engines 10 of motor vehicles, but may also particularly be advantageously used in stationary engines.

It may also be particularly important to implement the example method according to the present invention in the form of a computer program which is able to be run on a computer unit of control unit 32.

What is claimed is:

1. A method for operating an ignition device for an internal combustion engine of a motor vehicle, having a laser device which has a laser-active solid that has passive Q-switch, the method comprising:

selecting a duration of a pumping light pulse that is applied to the laser device as a function of a specifiable number of laser pulses to be generated using the laser device; and operating the laser device with the selected duration of the pumping light pulse.

2. The method as recited in claim 1, wherein a power of the pumping light is modified.

3. The method as recited in claim 2, wherein the power of the pumping light is modified during a pumping light pulse.

4. The method as recited in claim 2, wherein a plurality of laser pulses is generated by the selection of the duration of a pumping light pulse to clean a combustion chamber window of the laser device.

5. The method as recited in claim 2, wherein the duration of a pumping light pulse is selected to be at least so long that during the duration at least two laser pulses are generated.

6. An ignition device for an internal combustion engine of a motor vehicle, comprising:

a laser device which has a laser-active solid that has a passive Q-switch; and an arrangement adapted to select a duration of a pumping light pulse that is applied to the laser device as a function of a specifiable number of laser pulses generated using the laser device.

7. The ignition device as recited in claim 6, wherein the laser device is adapted to generate laser pulses, during application to it of pumping light, at a time interval of about 20 μs to about 200 μs.

8. A non-transitory memory medium storing a computer program, the computer program, when executed by a control unit, causing the control unit to select a duration of a pumping light pulse that is applied to a laser device as a function of a specified number of laser pulses to be generated by using the laser device, the laser device being in an ignition device of a motor vehicle and having a laser-active solid that has a Q-switch.

9. A control unit for an ignition device of an internal combustion engine of a motor vehicle, the control unit adapted to select a duration of a pumping light pulse that is applied to a laser device as a function of a specified number of laser pulses to be generated by using the laser device, the laser device being in an ignition device of a motor vehicle and having a laser-active solid that has a Q-switch.

* * * * *